United States Patent [19]

Chang et al.

[11] 3,894,102

[45] July 8, 1975

[54] CONVERSION OF SYNTHESIS GAS TO GASOLINE

[75] Inventors: Clarence D. Chang, Princeton, N.J.; Anthony J. Silvestri, Morrisville, Pa.

[73] Assignee: Mobil Oil Corporation, New York, N.Y.

[22] Filed: Aug. 9, 1973

[21] Appl. No.: 387,217

[52] U.S. Cl. ............. 260/668 R; 208/135; 208/141; 260/449 R; 260/449.5; 260/673; 260/673.5; 260/676 R; 260/682

[51] Int. Cl. ........................... C07c 1/04; C07c 1/20

[58] Field of Search ......... 208/135, 141; 260/668 R, 260/449 R, 449 M, 449 L, 449.5, 671 C, 671 M, 671 R, 673, 673.5, 682, 676 R; 252/455 Z

[56] References Cited
UNITED STATES PATENTS 3,728,408    4/1973    Tobias............................. 260/668 C

*Primary Examiner*—C. Davis
*Attorney, Agent, or Firm*—Charles A. Huggett; Michael G. Gilman

[57] ABSTRACT

Contacting snythesis gas (mixed carbon monoxide and hydrogen) with a mixture of a carbon monoxide hydrogenation catalyst and an acid dehydration catalyst to produce a first stage product comprising dimethyl ether and contacting this first stage product, preferably in its entirety, with a crystalline aluminosilicate having a silica to alumina ratio of at least about 12 and a constraint index of about 1 to 12 to convert it to high octane gasoline.

5 Claims, No Drawings

CONVERSION OF SYNTHESIS GAS TO GASOLINE

This invention relates to the production of synthetic gasoline. It more particularly refers to the conversion of synthesis gas to high quality gasoline.

With the growing demand for gasoline and other light petroleum products, including light gases, and the growing shortage of crude oil supply, continually stronger interest has been shown in tapping alternate raw material sources from which to obtain the desired light petroleum products. This is not a new inquiry. For many years workers in the energy generation field have sought techniques for converting fossil fuels other than crude oil into light petroleum products. Conversions of coal, shale oil and/or tar sands are three routes from non-petroleum raw materials which have been and continue to be under investigation for this purpose. At this time, however, it continues to be economically inefficient to utilize these hydrocarbon sources for the manufacture of light petroleum products.

It is generally known that various hydrocarbon sources, solid and/or gaseous, can be readily converted into a mixture of carbon monoxide and more or less hydrogen depending upon the chemical character of the particular source of hydrocarbons selected. Hydrogen can be added to the mixture from an outside source to provide proper stoichiometry and the mixture converted into other products. Fischer-Tropsch synthesis is characteristic of many past attempts to produce gasoline and other light products from non-liquid petroleum feedstocks. According to this procedure, synthesis gas (mixed carbon monoxide and hydrogen) is contacted with an iron or cobalt catalyst and is converted into a gasoline boiling range product. Unfortunately this product is predominantly paraffinic hydrocarbons and therefore has a rather low octane number (R + O about 50). Thus, while "gasoline" can be produced from synthesis gas by known techniques, it is substantially unsuited to use in modern internal combustion engines without extensive upgrading.

It is also known that synthesis gas, with its carbon monoxide-hydrogen ratio properly adjusted, can be efficiently converted into methanol by contacting such gas with methanol synthesis catalysts such as those containing copper. A companion, copending patent application Serial No. 387,223, filed Aug. 9, 1973 has disclosed and claimed the conversion of methanol and/or other alcohols to gasoline boiling range materials having a high aromatic hydrocarbon content and thus a high blending octane number. According to this process, a feed comprising methanol is contacted with a high silica-alumina ratio zeolite catalyst at least about 500°F to convert substantially all of the alcohol to higher hydrocarbons.

Although methanol synthesis from synthesis gas is widely known and well documented, it is not very efficiently practiced because the economics of the conversion often leave something to be desired. One of the problems associated with methanol synthesis is the rather low equilibrium conversion (carbon efficiency) from carbon monoxide to methanol necessitating very large recycles of unreacted carbon monoxide and hydrogen thus significantly increasing the size of the equipment and therefore the capital required for the project.

It has been suggested that methanol synthesis be combined with methanol aromatization in order to drive the reaction (equilibrium) from the carbon monoxide side to the hydrocarbon side. While this does work to directly produce gasoline, there are some very real problems associated therewith. In the first place, the methanol synthesis catalyst is basically a good hydrogenation catalyst and therefore tends to cause hydrogenation of the hydrocarbon product produced from the methanol by contact with the high silica to alumina ratio zeolite. This not only reduces the octane number of the hydrocarbon product but also uses up considerable quantities of hydrogen in the process and hydrogen is a rather expensive commodity. Secondly, optimum methanol synthesis temperatures and pressures are significantly different from optimum temperatures and pressures for conversion of the methanol to hydrocarbons thus necessitating operating at conditions which are less than optimum for one of these reactions or under compromise conditions which are less than satisfactory for both reactions. A third problem stems from the fact that the zeolite catalyst is at least to some extent steam sensitive and, since one mole of steam is produced per mole of methanol converted to hydrocarbon, an economic and technical detriment is encountered.

It is therefore an object of this invention to provide a novel technique of converting carbon monoxide to gasoline.

It is another object of this invention to provide a technique for converting carbon monoxide to high octane gasoline.

It is a further object of this invention to carry out this conversion in a manner which is substantially less detrimental to the catalysts used than are prior art processes.

Other and additional objects of this invention will become apparent from a consideration of this entire specification including the claims hereof.

In accord with and fulfilling these objects, one aspect of this invention resides in contacting a mixture of carbon monoxide and hydrogen with a mixed methanol synthesis and acidic dehydration catalyst at about 300° to 700°F in a first stage to produce a first stage product comprising dimethyl ether as the major organic chemical product, and then contacting such in a second stage with a high silica to alumina ratio zeolite at about 500° to 850°F to produce a second stage product comprising aromatic hydrocarbons. In a preferred aspect of this invention, the first stage operates at elevated pressures of up to about 10,000 psig and a space velocity of at least about 500 VHSV, and the second stage operates at a pressure of about 0 to 3000 psig and a space velocity of about 0.5 to 1000 WHSV.

While the entire first stage product may be sent directly to the second stage without intermediate resolution, some interstage product separation may be desirable to accomplish specific goals. Thus, water with or without methanol, can be separated out of the first stage product and the remainder, comprising dimethyl ether and carbon oxides, treated in the second stage. The carbon oxides and $H_2$ can be recycled to the first stage reaction while discarding the first stage water. In the alternative, provision may be made for interstage separation of the organic from the inorganic first stage product components and substantially only the organic components may be fed to the second stage aromatization reaction. The inorganic components of the first stage product, that is carbon oxides and excess hydrogen, can be recycled in their entirety to the first stage, or they can be resolved to remove carbon dioxide, if any, which is vented or otherwise used, with the remaining carbon monoxide and hydrogen being recycled to the first stage. Product resolution is conventional such as by partial condensation, distillation, etc.

The first stage catalyst has been noted to be a mixture of methanol synthesis catalyst and acidic dehydration catalyst. These catalysts are employed in a weight ratio with respect to each other such as to maximize production of methanol + dimethyl ether while minimizing methanol production. The actual catalyst weight ratios will be dependent upon the activities of the catalysts and upon whether and how much methanol is taken out of the first stage reaction product and recycled.

Preferred first stage temperatures are about 450° to 550°F with first stage preferred pressures of about 150 to 1500 psig and preferred space velocities of up to about 30,000 VHSV.

Methanol synthesis catalysts are illustrated by zinc-chromium oxides, zinc-copper-chromium oxides and zinc-copper-aluminum oxides. One particular methanol synthesis catalyst which has been developed and has been found to give especially good results in the first stage of the instant process is a mixture of zinc-copper-chromium-rare earth oxides. Suitable weight ratios of metals are about 50 to 70 parts copper, 15 to 25 parts zinc, and 5 to 15 parts each of chromium and rare earth (particularly lanthanum). Acidic dehydration catalysts are exemplified by conventional solid acidic materials such as γ-alumina. It is preferred not to use for dehydration those acid zeolites which are to be used for conversion of the first stage product to hydrocarbons in the second stage of this process. The acidic dehydration catalyst is suitably in granular form. The first stage catalysts are intimately admixed together in a single bed or may be in two successive beds or in a series of alternating layers. The first stage reaction zone may be operated as a fixed or fluidized bed with upflow or downflow of reactants and conventional product removal. The first stage reaction product comprises dimethyl ether, steam, unreacted carbon monoxide and hydrogen and some carbon dioxide.

The organic intermediates formed in the first stage are suitably fed into the second, aromatization stage with a minimum of interstage cooling. The aromatization reaction is suitably carried out in an upflow or downflow reactor at the specified conditions with the catalyst bed in fixed or fluidized stage. Catalyst particle size will, of course, reflect the fixed or fluidized nature of the catalyst bed.

The second stage catalysts of this invention has some unusual properties. These catalysts induce profound transformations of aliphatic hydrocarbons to aromatic hydrocarbons in commercially desirable yields. Although they have unusually low alumina contents, i.e. high silica to alumina ratios, they are very active, even when the silica to alumina ratio exceeds 30. The activity is surprising since the alumina in the zeoliite framework is believed responsible for catalytic activity. These catalysts retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity.

An important characteristic of the crystal structure of this class of zeolites is that it provides constrained access to, and egress from, this intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type catalyst useful in this invention posess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although catalysts with a silica to alumina ratio of at least 12 are useful, it is preferred to use catalysts having higher ratios of at least about 30. Such catalysts, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight membered rings of oxygen atoms, then access to molecules of larger cross-section than normal hexane is excluded and the zeolite is not of the desired type. Windows of ten-membered rings are preferred, although excessive puckering or pore blockage may render these catalysts ineffective. Twelve-membered rings do not generally appear to offer sufficient constraint to produce the advantageous conversions, although structures can be conceived, due to pore blockage or other cause, that may be operative.

Rather than attempt to judge from crystal structure whether or not a catalyst posesses the necessary constrained access, a simple determination of the "constraint index" may be made by passing continuously a mixture of equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000°F for at least 15 minutes. The catalyst is then flushed with helium and the temperature adjusted between 550°F and 950°F to give an overall conversion between 10 percent and 60 percent. The mixture of hydrocarbons is passed at 1 liquid hourly space velocity (i.e. 1 volume of hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\text{Log}_{10} \text{ (fraction of n-hexane remaining)}}{\text{Log}_{10} \text{ (fraction of 3-methylpentane remaining)}}$$

The constraint index approximates the ratio of the cracking rate constants for the two hydrocarbons. Catalysts suitable for the present invention are those having a constraint index from 1.0 to 12.0, preferably 2.0 to 7.0

The class of zeolites defined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Patent 3,709,979, the entire contents of which are incorporated herein by reference.

ZSM-12 is more particularly described in West German Offenlagunschrifft No. 2,213,109, the entire contents of which are incorporated herein by reference.

ZSM-21 is more particularly described in U.S. Application, Ser. No. 358,192, filed May 7, 1973, and now abandoned, the entire contents of which are incorporated herein by reference.

TEA mordenite is more particularly described in U.S. Application Ser. No. 130,442 filed Apr. 11, 1971, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000°F for one hour, for example, followed by base exchange with ammonium salts followed by calcination at 1000°F in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000°F for from about 15 minutes to about 24 hours.

Natural zeolites may sometimes be converted to this type zeolite catalysts by various activation procedures and other treatments such as base exchange, steaming, alumina extraction and calcination, in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12, ZSM-21 and TEA mordenite, with ZSM-5 particularly preferred.

The catalysts of this invention may be in the hydrogen form or they may be base exchanged or impregnated to contain ammonium or a metal cation complement. It is desirable to calcine the catalyst after base exchange. The metal cations that may be present include any of the cations of the metals of Groups I through VIII of the periodic table. However, in the case of Group IA metals, the cation content should in no case be so large as to effectively inactivate the catalyst. For example, a completely sodium exchanged H-ZSM-5 is not operative in the present invention.

In a preferred aspect of this invention, the catalysts hereof are selected as those having a crystal density, in the dry hydrogen form, of not substantially below about 1.6 grams per cubic centimeter. It has been found that zeolites which satisfy all three of these criteria are most desired because they tend to maximize the production of gasoline boiling range hydrocarbon products. Therefore, the preferred catalysts of this invention are those having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 11 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, is important as the locus of catalytic activity.

The following Examples will illustrate the practice of this invention without being in anyway limiting on the scope thereof. Parts and percentages are by weight unless expressly stated to be to the contrary.

EXAMPLE 1 - (prior art)

This Example shows the conversion of synthesis gas to a product comprising methanol, by contact of such gas with a Zn-Cu-Cr-lanthanum oxide catalyst; followed by conversion of the product to a hydrocarbon product having a major portion in the gasoline boiling range by contact with an H ZSM-5 catalyst. The first stage was operated with a carbon monoxide to hydrogen mole ratio of 0.25, a temperature of 600°F, pressure of 50 Atm., space velocity of 6,000 VHSV to produce an intermediate product having the following characteristics:

| | |
|---|---|
| Carbon conversion to organics | 14.9 % |
| Methanol content | 17.02% |
| Carbon monoxide content | 50.87% |
| Hydrogen content | 16.39% |
| Water content | 15.73% |
| Carbon dioxide content | trace |

This intermediate product was converted into a hydrocarbon product by contacting such with H ZSM-5 at 700°F and a space velocity (calculated on methanol) of 1 LHSV to yield a product having the following characteristics:

| | |
|---|---|
| Carbon converted from feed carbon | 8.9 pounds per |

-Continued

| | |
|---|---|
| monoxide to liquid ($C_5^+$) product (water free basis) | 100 pounds |

EXAMPLE 2

Example 1 was repeated except that the first stage catalyst was a mixture of 1 part of said copper catalyst and 1 part of a -alumina catalyst. The intermediate product was characterized as follows:

| | |
|---|---|
| Carbon conversion to organics | 42% |
| Dimethyl ether content | 25% |
| Carbon monoxide content | 25% |
| Hydrogen content | 15% |
| Water content | 1% |
| Carbon dioxide content | 29% |

The organic phase was converted to hydrocarbons in a second stage at the conditions set forth in Example 1 to produce a product characterized as follows:

Carbon converted from feed carbon 25.2 pounds monoxide to liquid ($C_5^+$) product per 100 pounds

EXAMPLE 3

Example 2 was repeated using the same catalysts as in Example 2. Temperature was 482°F, pressure was 50 atmospheres and space velocity relative to the methanol synthesis catalyst was 2,900 VHSV. The hydrocarbon product from the second stage was characterized as follows:

| | |
|---|---|
| Carbon converted from feed carbon monoxide to liquid ($C_5^+$) product | 39.6 pounds per 100 pounds |

EXAMPLE 4

A mixture of 228.14 parts of copper nitrate, 136.52 parts of zinc nitrate, 19.23 parts of chromium oxide and 21.63 parts of lanthanum nitrite was dissolved in 500 parts of water at 90°C. A solution of 400 parts of sodium carbonate in 2500 parts of water was added to co-precipitate the metals. The metal values were dried and calcined overnight at 265°C.

EXAMPLE 5

The oxide mixture of Example 4 was used in admixture with an equal quantity of γ-alumina and a 4 to 1 mixture of hydrogen and carbon monoxide passed thereover at 600°F, 50 Atm. and 7,500 VHSV. Yield was 37% CO, 20% $CO_2$, 1.3% $H_2O$, 1.8% methanol and 18.9% dimethyl ether.

What is claimed is:

1. A process comprising contacting in a first stage a mixture of carbon monoxide and hydrogen with a catalyst comprising a mixture of a methanol synthesis catalyst and an acidic dehydration catalyst at an elevated temperature up to about 700°F and such combination of conditions as to produce a first stage product comprising dimethyl ether; and contacting at least said dimethyl ether with a crystalline aluminosilicate zeolite having a silica to alumina ratio of at least about 12 to 1 and a constraint index of about 1 to 12 in a second stage at about 550° to 850°F under such combination of conditions as to produce a product the organic portion of which is predominantly liquid hydrocarbons boiling in the $C_5$ to 400°F range.

2. A process as claimed in claim 1 including utilizing as said first stage catalyst a mixture of said methanol synthesis catalyst and γ-alumina as said acid dehydration catalyst.

3. A process as claimed in claim 1 wherein said first stage is carried out at least about 300°F.

4. A process as claimed in claim 1 wherein the second stage catalyst is HZSM-5.

5. A process as claimed in claim 4 wherein the methanol synthesis catalyst comprises mixed oxides of zinc, chromium, copper and a rare earth.

* * * * *